(12) United States Patent
Sugimura et al.

(10) Patent No.: US 7,468,017 B2
(45) Date of Patent: Dec. 23, 2008

(54) GEAR SHIFTING COMPLETION DETERMINATION DEVICE FOR AUTOMATIC TRANSMISSION

(75) Inventors: Toshio Sugimura, Nagoya (JP); Toshinari Suzuki, Nishikamo-gun (JP); Tatsuya Kawamura, Nissin (JP); Atsushi Ayabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 325 days.

(21) Appl. No.: 10/579,299

(22) PCT Filed: Apr. 25, 2005

(86) PCT No.: PCT/JP2005/008373

§ 371 (c)(1),
(2), (4) Date: May 15, 2006

(87) PCT Pub. No.: WO2005/103529

PCT Pub. Date: Nov. 3, 2005

(65) Prior Publication Data

US 2007/0093357 A1    Apr. 26, 2007

(30) Foreign Application Priority Data

Apr. 26, 2004  (JP) .............................. 2004-129898

(51) Int. Cl.
*F16H 61/08*   (2006.01)
(52) U.S. Cl. .................... 477/53; 477/115; 475/118; 475/121; 701/64

(58) Field of Classification Search .................... 477/53, 477/80; 475/118, 121; 701/64, 66
See application file for complete search history.

(56) References Cited

U.S. PATENT DOCUMENTS

| 5,047,935 | A  | * | 9/1991  | Kashihara ..................... 701/64 |
| 6,390,949 | B1 |   | 5/2002  | Kondo et al. |
| 6,676,567 | B2 | * | 1/2004  | Saito ........................... 477/143 |
| 2003/0233185 | A1 | | 12/2003 | Takebayashi et al. |

FOREIGN PATENT DOCUMENTS

| JP | A-02-238139  | 9/1990 |
| JP | A-2000-097331 | 4/2000 |
| JP | A-2001-065679 | 3/2001 |
| JP | A-2004-019713 | 1/2004 |
| JP | A-2004-125106 | 4/2004 |

* cited by examiner

Primary Examiner—Sherry Estremsky
Assistant Examiner—Edwin A Young
(74) Attorney, Agent, or Firm—Oliff & Berridge, PLC

(57) ABSTRACT

An ECT_ECU of the present invention executes a program including the step of setting a determination time T for determining the completion of an upshift in an accelerator off mode to a short determination time T (X) when a slip value NS (NS=NE−NT) between an engine revolution NE and a turbine revolution NT is smaller than a predetermined slip value NS (0) (when the difference between NT and NE is large, and the step of setting the determination time T to a long determination time T (Y) when the slip value NS (NS=NE−NT) is larger than the predetermined slip value NS (0) (when the difference between NT and NE is small).

2 Claims, 4 Drawing Sheets

GEAR SHIFTING COMPLETION DETERMINATION DEVICE FOR AUTOMATIC TRANSMISSION

TECHNICAL FIELD

The present invention relates to a gear shifting completion determination device for an automatic transmission, particularly to a gear shifting completion determination device for an automatic transmission coupled to a motive power source via a fluid coupling.

BACKGROUND ART

Conventionally in an automatic transmission, gear shifting is effected one by one in order to avoid complicated multiple gear shifting (for example, speed change establishing fourth speed gear from second speed gear without establishing third speed gear). In such an automatic transmission, the next gear shifting is permitted only after determination has been made of the completion of previous gear shifting. It is therefore necessary to determine completion of gear shifting at an appropriate time.

Japanese Patent Laying-Open No. 2000-97331 discloses an automatic transmission that can properly determine the completion timing of inertia phase control. The automatic transmission disclosed in the publication of Japanese Patent Laying-Open No. 2000-97331 includes an input shaft receiving driving force from a driving mechanism, an output shaft transmitting the driving force to the wheels, a plurality of engagement elements setting the motive power transmitting characteristics between the input shaft and the output shaft, a detection unit detecting the revolution of the input shaft and the revolution of the output shaft, and a control unit controlling the release and engagement of a friction engagement element. The control unit determines that the friction engagement element has been sufficiently engaged to end the inertia phase control when a state of the gear ratio calculated based on the revolution of the input shaft and the revolution of the output shaft detected by the detection unit synchronizing with the gear ratio to be achieved by gear shifting continues for at least a predetermined determination time. The gear ratio is the value of the input shaft revolution divided by the output shaft revolution.

The automatic transmission disclosed in this publication is configured to end the inertia phase control at an elapse of a predetermined determination time for a state in which the gear ratio synchronizes with the gear ratio to be achieved. Accordingly, the inertia phase control can be continued even in the case where the gear ratio temporarily synchronizes with the gear ratio after gear shifting due to reduction in the engine speed, for example. The inertia phase control is terminated only when the synchronizing state continues for at least the predetermined determination time and the friction engagement element of the engagement side establishes sufficient engagement. Therefore, occurrence of gear shifting shock can be suppressed. By monitoring the gear ratio synchronizing time, determination of ending the inertia phase control can be made appropriately.

In the automatic transmission disclosed in the aforementioned publication, the next gear shifting will not be permitted unless the synchronizing state continues for at least the predetermined determination time in the case where gear shifting is set to be effected one gear at a time to obviate multiple gear shifting. There was a problem that the time required to eventually complete gear shifting becomes longer when gear shifting of a plurality of shifts is to be effected.

DISCLOSURE OF THE INVENTION

An object of the present invention is to provide a gear shifting completion determination device for an automatic transmission that can appropriately determine completion of gear shifting and promptly effect gear shifting.

A gear shifting completion determination device for an automatic transmission according to the present invention is applied to an automatic transmission coupled to a motive power source via a fluid coupling, and determines whether an upshift in an accelerator off mode has been completed or not. The gear shifting completion determination device includes an output shaft revolution detection unit detecting the output shaft revolution of the motive power source, an input shaft revolution detection unit detecting the input shaft revolution of the automatic transmission, a calculation unit calculating a synchronizing revolution that is the probable value of the input shaft revolution of the automatic transmission after gear shifting, a determination unit determining that gear shifting has been completed when a state of the detected input shaft revolution of the automatic transmission synchronizing with the calculated synchronizing revolution continues for at least a predetermined determination time, and a setting unit setting the determination time based on the detected input shaft revolution of the automatic transmission and the output shaft revolution of the motive power source.

In accordance with the present invention, the output shaft revolution detection unit detects the output shaft revolution of the motive power source, whereas the input shaft revolution detection unit detects the input shaft revolution of the automatic transmission. The calculation unit calculates the synchronizing revolution that is the probable value of the input shaft revolution of the automatic transmission after gear shifting, and the determination unit determines that gear shifting has been completed when the state of the input shaft revolution of the automatic transmission synchronizing with the synchronizing revolution continues for at least a predetermined determination time. The determination time is set by the setting unit based on the input shaft revolution of the automatic transmission and the output shaft revolution of the motive power source. When the accelerator is off, the motive power source takes a non-driving state. For example, when the difference between the input shaft revolution of the automatic transmission and the output shaft revolution of the motive power source is large, a state is established in which the input shaft revolution of the automatic transmission is boosted with respect to the output shaft revolution of the motive power source due to the development of gear shifting at the automatic transmission. An event of the input shaft revolution of the automatic transmission synchronizing with the synchronizing revolution under this state can be regarded as the gear shifting of the automatic transmission being completed. In this case, reducing the determination time will cause prompt determination of completion in gear shifting to allow the next gear-shifting to be initiated. In contrast, when the difference between the input shaft revolution of the automatic transmission and the output shaft revolution of the motive power source is small, it is difficult to determine whether the input shaft revolution of the automatic transmission has synchronized with the synchronizing revolution due to development of gear shifting, or just temporarily in synchronism. For example, when the synchronizing revolution is in the vicinity of the idle revolution, the input shaft revolution may synchronize with the synchronizing revolution even if gear shifting has not been completed yet. In this case, the determination time can be increased to suppress erroneous determination of the input shaft revolution of the automatic transmission temporarily synchronizing with the synchronizing revolution. As a result, there can be provided a gear shifting completion determination device for an automatic transmission that can appropriately determine completion of gear shifting and promptly effect gear shifting.

Preferably, the setting unit sets the determination time shorter when the difference between the input shaft revolution of the automatic transmission and the output shaft revolution of the motive power source is large as compared to a state in which the same is small.

According to the present invention, the determination time is set shorter when the difference between the input shaft revolution of the automatic transmission and the output shaft revolution of the motive power source is large as compared to a state in which the same is small. When the difference between the input shaft revolution of the automatic transmission and the output shaft revolution of the power source is large, a state is established in which the input shaft revolution of the automatic transmission is boosted with respect to the output shaft revolution of the motive power source due to the development of gear shifting at the automatic transmission. An event of the input shaft revolution of the automatic transmission synchronizing with the synchronizing revolution under this state can be regarded as the gear shifting of the automatic transmission being completed. Therefore, by setting a shorter determination time when the difference between the input shaft revolution of the automatic transmission and the output shaft revolution of the power source is large as compared to a state in which the same is small, determination of completion in gear shifting can be made promptly to allow the next gear shifting to be effected.

BEST MODE FOR CARRYING OUT THE INVENTION

Figure 1:
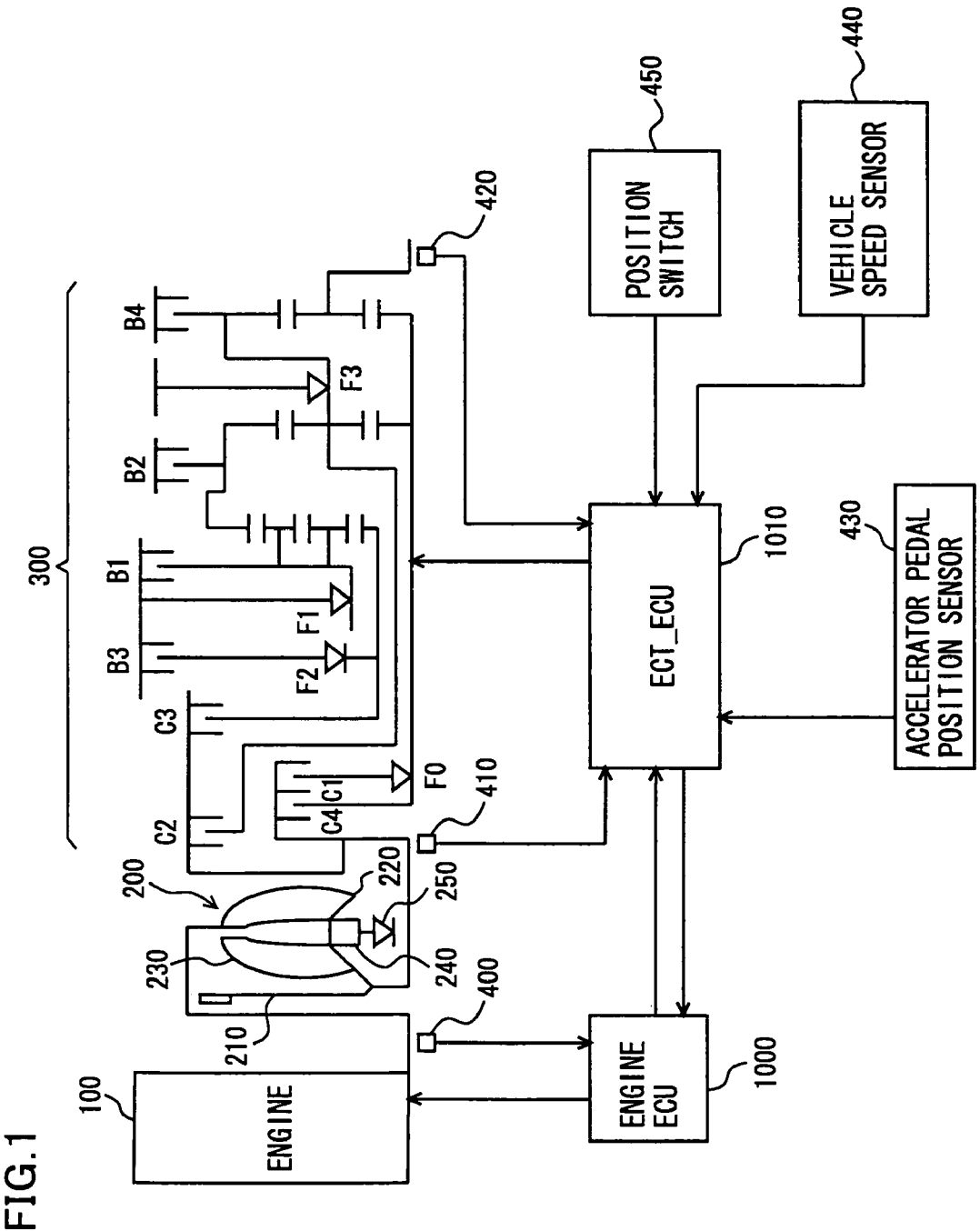
FIG. 1 is a control block diagram of a power train of a vehicle on which a gear shifting completion determination device for an automatic transmission according to an embodiment is mounted.

An embodiment of the present invention will be described hereinafter with reference to the drawings. In the following description, the same components have the same reference characters allotted. Their designation and function are also identical. Therefore, detailed description thereof will not be repeated.

A power train of a vehicle on which a gear shifting completion determination device for an automatic transmission according to an embodiment of the present invention is mounted will be described with reference to FIG. 1. A gear shifting completion determination device according to the present embodiment is realized by, for example, an ECT (Electrically Controlled Transmission)_ECU (Electronic Control Unit) 1010 shown in FIG. 1.

As shown in FIG. 1, the vehicle power train includes an engine 100, a torque converter 200, an automatic transmission 300, an engine ECU 1000, and ECT_ECU 1010.

Engine 100 burns the air-fuel mixture of air and fuel injected from an injector (not shown) to reciprocate a piston and rotate a crank shaft (output shaft). The output shaft of engine 100 is connected to the input shaft of torque converter 200. Engine 100 and torque converter 200 are coupled by a rotational shaft. Therefore, the output shaft revolution NE of engine 100 (engine revolution speed NE) sensed by an engine revolution sensor 400 is equal to the input revolution of torque converter 200 (pump revolution).

Torque converter 200 is formed of a lock up clutch 210 establishing direct coupling between the input shaft and output shaft, a pump vane wheel 220 at the input shaft side, a turbine vane wheel 230 at the output shaft side, and a stator 240 exhibiting a torque multiplication function with a one way clutch 250. Torque converter 200 is connected with automatic transmission 300 by a rotational shaft. The output shaft revolution NT of torque converter 200 (turbine revolution NT) is sensed by a turbine revolution sensor 410.

The output shaft of torque converter 200 is connected to the input shaft of automatic transmission 300. Torque converter 200 and automatic transmission 300 are coupled with the rotational shaft. Therefore, the output shaft revolution of torque converter 200 (turbine revolution NT) sensed by a turbine revolution sensor 410 is equal to the input shaft revolution of automatic transmission 300.

Automatic transmission 300 is formed of a planetary gear unit to establish an arbitrary gear by engaging the clutch and brake in a predetermined combination. The clutch and brake operate by the oil pressure adjusted by an oil hydraulic circuit (not shown). The output shaft revolution NO of automatic transmission 300 is sensed by an output shaft revolution sensor 420.

Engine ECU 1000 controls engine 100. Engine ECU 1000 receives a signal representing engine revolution NE from engine revolution sensor 400. The signal representing engine revolution NE applied to engine ECU 1000 is transmitted to ECT_ECU 1010.

ECT_ECU 1010 controls automatic transmission 300. To ECT_ECU 1010 are input a signal representing turbine revolution NT from turbine revolution sensor 410, a signal representing output shaft revolution NO of automatic transmission 300 from output shaft revolution sensor 420, a signal representing the accelerator pedal position from an accelerator pedal position sensor 430, a signal representing the speed of the vehicle from a vehicle speed sensor 440, a signal representing the shift lever position from a position switch 450, and a signal representing engine revolution NE from engine ECU 1000. ECT_ECU 1010 obtains the input revolution of torque converter 200 from engine revolution NE, and obtains the input shaft revolution of automatic transmission 300 from turbine revolution NT.

ECT_ECU 1010 sets a shift map (shifting diagram) according to the state of the vehicle, and controls automatic transmission 300 such that a desired gear is established based on the set shift map. ECT_ECU 1010 controls automatic transmission 300 such that gear shifting is effected one gear at a time. In other words, ECT_ECU 1010 determines whether gear shifting has been completed or not, and permits the next gear shifting when determination is made of completion of gear shifting.

Figure 2:
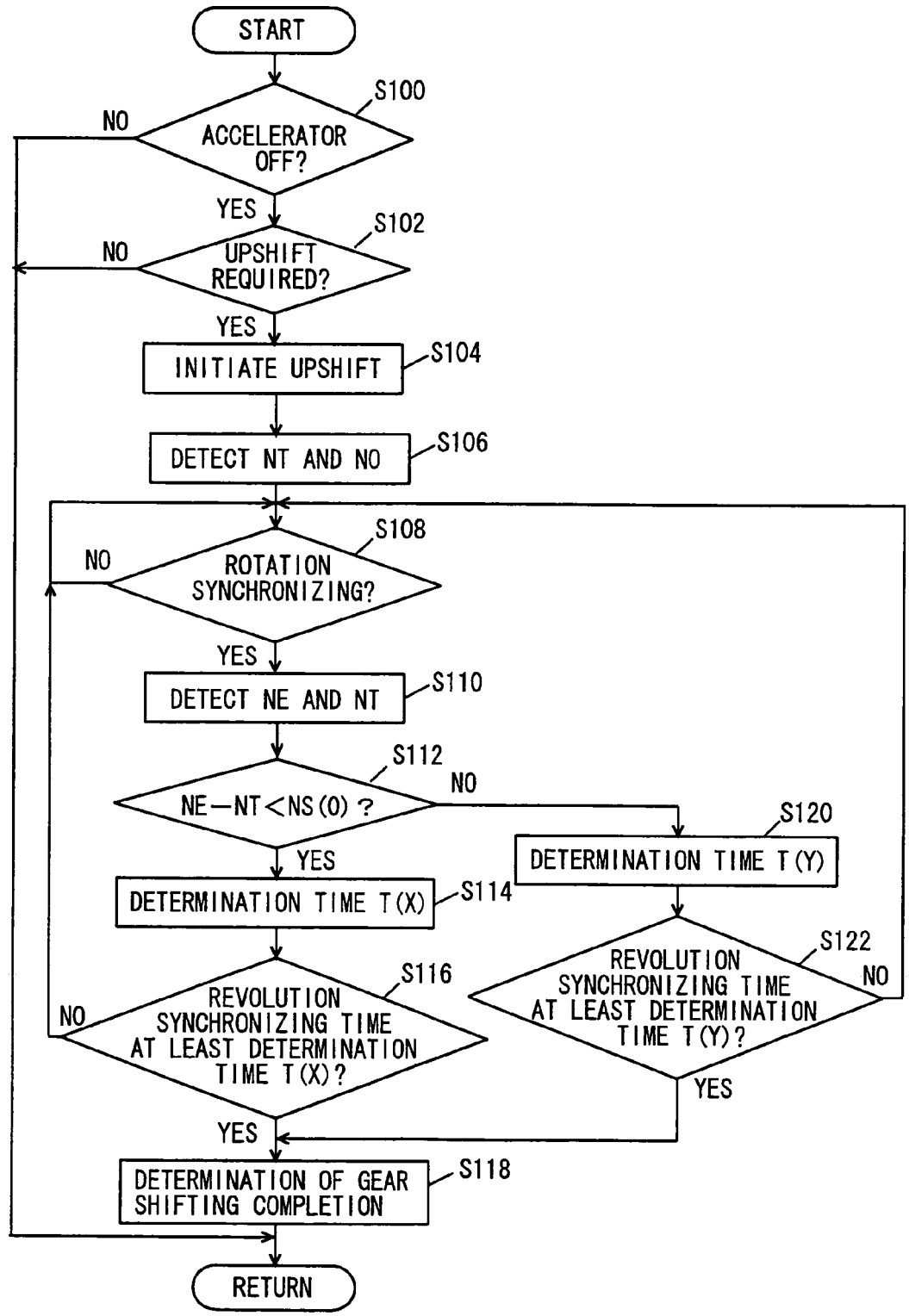
FIG. 2 is a flow chart of a control configuration of a program executed by an ECT_ECU.

The control configuration of a program executed by ECT_ECU 1010 in the gear shifting completion determination device for an automatic transmission according to an embodiment of the present invention will be described with reference to FIG. 2.

At step (hereinafter, step abbreviated as S) 100, ECT_ECU 1010 determines whether the accelerator pedal is released or not based on a signal transmitted from accelerator pedal position sensor 430. When the accelerator pedal is released (YES at S100), the process proceeds to S102; otherwise (NO at S100), the process ends.

At S102, ECT_ECU 1010 determines whether an upshift at automatic transmission 300 is required or not. Determination of whether an upshift is required or not is to be made based on the accelerator pedal position, the vehicle speed, and the shifting diagram. When an upshift is required (YES at S102), the process proceeds to S104; otherwise (NO at S102), the process ends.

At S104, ECT_ECU 1010 initiates an upshift. At S106, ECT_ECU 1010 senses turbine revolution NT (input shaft revolution of automatic transmission 300) and output shaft revolution NO of automatic transmission 300.

At S108, ECT_ECU 1010 determines whether turbine revolution NT synchronizes with the synchronizing revolution. The synchronizing revolution is the number of revolutions calculated by multiplying output shaft revolution NO of automatic transmission 300 by the gear ratio of the gear after gear shifting. When turbine revolution NT synchronizes with the synchronizing revolution (YES at S108), the process proceeds to S110; otherwise (NO at S108), the process proceeds to S108. In the present embodiment, the event of turbine revolution NT synchronizing with the synchronizing revolution means that the difference between turbine revolution NT and the synchronizing revolution is smaller than a predetermined value.

At S110, ECT_ECU 1010 detects engine revolution NE and turbine revolution NT. At S112, ECT_ECU 1010 determines whether a slip value NS that is the difference between engine revolution NE and turbine revolution NC (NS=NE−NT) is smaller than a predetermined slip value NS (0). In the present embodiment, NS (0) is set as a negative value. When slip value NS is smaller than a predetermined slip value NS (0) (YES at S112), the process proceeds to S114; otherwise (NO at S112), the process proceeds to S120.

At S114, ECT_ECU 1010 sets determination time T to a short determination time T (X). Determination time T (X) is set shorter as slip value NS is smaller (as the difference between engine revolution NE and turbine revolution NT is larger). Determination time T (X) is to be set using a map produced in advance based on, for example, experiments.

At S116, ECT_ECU 1010 determines whether the period of time during which turbine revolution NT synchronizes with the synchronizing revolution is at least determination time T (X). When the duration of turbine revolution NT synchronizing with the synchronizing revolution is at least determination time T (X) (YES at S116), the process proceeds to S118; otherwise (NO at S116), the process proceeds to S108. At S118, ECT_ECU 1010 determines that gear shifting has been completed.

At S120, ECT_ECU 1010 sets determination time T to a long determination time T (Y). Determination time T (Y) is longer than determination time T (X). Determination time T (Y) is set longer as slip value NS is larger (as the difference between engine revolution NE and turbine revolution NT is smaller). Determination time T (Y) is to be set using a map produced in advance based on, for example, experiments or the like.

At S122, ECT_ECU 1010 determines whether the period of time during which turbine revolution NT synchronizes with the synchronizing revolution is at least determination time T (Y). When the duration of turbine revolution NT synchronizing with the synchronizing revolution is at least determination time T (Y) (YES at S122), the process proceeds to S118; otherwise (NO at S122), the process proceeds to S108.

An operation of ECT_ECU 1010 at the gear shifting completion determination device of an automatic transmission according to the present embodiment will be described based on the configuration and flow chart set forth above.

When the driver takes his/her foot off the accelerator pedal during the drive of a vehicle (YES at S100), determination is made whether an upshift at automatic transmission 300 is required or not (S102). When an upshift is required (YES at S102), an upshift is initiated (S104). Turbine revolution NT (input shaft revolution of automatic transmission 300) and output shaft revolution NO of automatic transmission 300 are sensed (S106).

When turbine revolution NT synchronizes with the synchronizing revolution that is calculated by multiplying output shaft revolution NO of automatic transmission 300 by the gear ratio of the gear after gear shifting (YES at S108), engine revolution NE and turbine revolution NT are sensed (S110).

Figure 3:
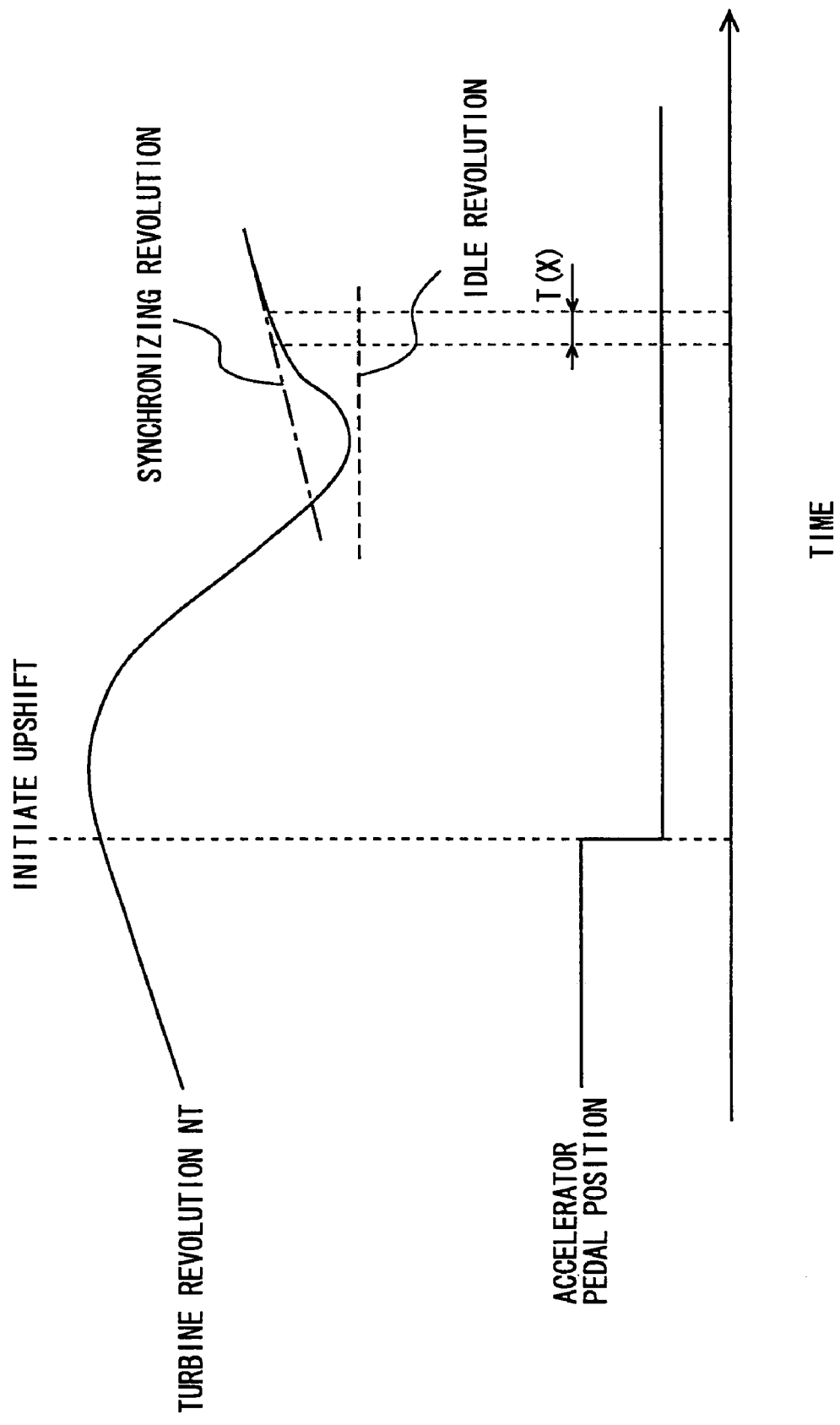
FIG. 3 is a (first) timing chart representing a turbine revolution NT during an upshift in an accelerator off mode.

When an upshift is initiated as shown in FIG. 3 in an upshift procedure with the accelerator off, turbine revolution NT (input shaft revolution of automatic transmission 300) is reduced in accordance with the lower engine revolution NE. As gear shifting is developed, turbine revolution NT, once falling, is boosted with respect to engine revolution NE. In this case, the difference between turbine revolution NT and engine revolution NE is increased with turbine revolution NT higher than the idle revolution (engine revolution NE). Slip value NS between turbine revolution NT and engine revolution NE (NS=NE−NT) becomes smaller than predetermined slip value NS (0) (YES at S112).

When turbine revolution NT is synchronizing with the synchronizing revolution under the state where turbine revolution NT is boosted with respect to engine revolution NE, it is assumed that gear shifting has been completed. Therefore, determination is promptly made of completion of gear shifting, and a state allowing the next gear shifting must be established.

To this end, determination time T is set to shorter determination time T (X) (S114), and determination is made that gear shifting has been completed (S118) when the period of time of turbine revolution NT synchronizing with the synchronizing revolution is at least determination time T (X) (YES at S116). Accordingly, determination of completion of gear shifting can be made promptly under the state where it is assumed that gear shifting has been completed to allow prompt transition to the next gear shifting.

Figure 4:
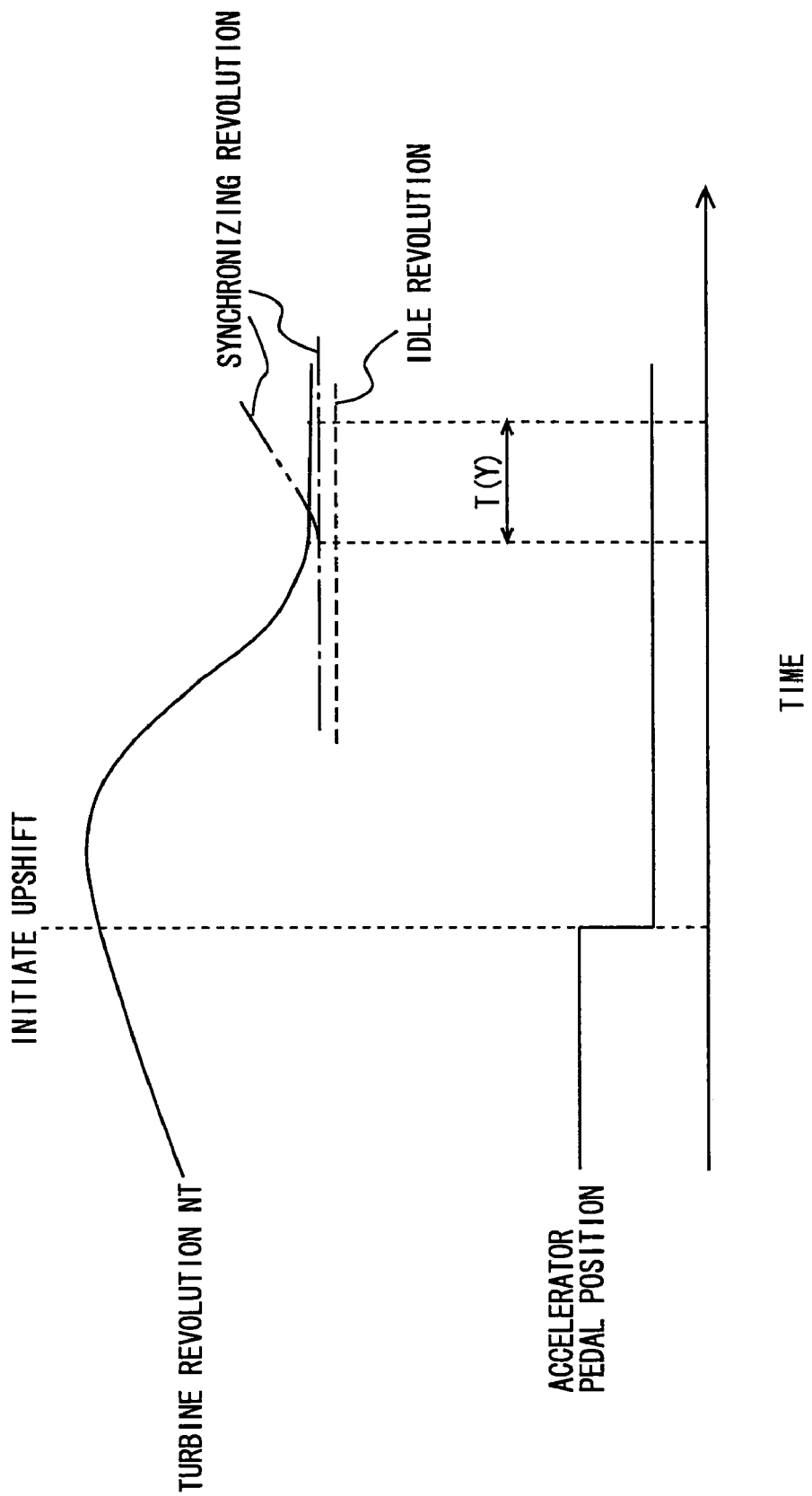
FIG. 4 is a (second) timing chart representing a turbine revolution NT during an upshift in an accelerator off mode.

During upshifting with the accelerator off, there may be a case where turbine revolution NT settles in the vicinity of the idle revolution before gear shifting is completed, as shown in FIG. 4. Therefore, when the synchronizing revolution is in the vicinity of the idle revolution, it is difficult to determine whether turbine revolution NT synchronizes with the synchronizing revolution due to development of gear shifting or just temporarily in synchronism. If erroneous determination is made of the gear shifting being completed although not actually completed, there is the possibility of the engagement force of the clutch and brake in automatic transmission 300 being increased to the highest pressing level to cause gear shifting shock.

In order to suppress erroneous determination, a determination time T (Y) longer than determination time T (X) is set (S120), when turbine revolution NT is in the vicinity of the idle revolution, i.e. when the difference between engine revolution NE and turbine revolution NT is small and slip value NS (NS=NE−NT) is larger than a predetermined slip value NS (0) (NO at S112).

As indicated by the chain line with one dot in FIG. 4, when the period of time of turbine revolution NT synchronizing with the synchronizing revolution is at least determination time T (Y) (YES at S122), determination is made that gear shifting has been completed (S118).

As indicated by the chain line with two dots in FIG. 4, when turbine revolution NT does not change and the period of time of turbine revolution NT synchronizing with the synchronizing revolution is shorter than determination time T (Y) (NO at S122) although there is variation in the vehicle speed caused by disturbance and the like during gear shifting and the synchronizing revolution has changed, determination will be made of gear shifting not being completed. Accordingly, erroneous determination of gear shifting completion corresponding to the case where turbine revolution NT temporarily synchronizes with the synchronizing revolution although gear shifting has not actually ended can be suppressed.

In a control apparatus for a vehicle according to the present embodiment, the ECT_ECU sets determination time T to a short determination time T (X) when slip value NS between engine revolution NE and turbine revolution NT is smaller than a predetermined slip value NS (0) (when the difference between engine revolution NE and turbine revolution NT is large). When slip value NS between engine revolution NE and turbine revolution NT is greater than a predetermined slip value NS (0) (when the difference between engine revolution NE and turbine revolution NT is small), determination time T is set to a long determination time T (Y). Accordingly, in the event of turbine revolution NT synchronizing with the synchronizing revolution when the difference between engine revolution NE and turbine revolution NT is large, allowing assumption of completion in gear shifting, the determination time is set short to promptly enable subsequent gear shifting in an automatic transmission that effects gear shifting one gear at a time. In the case where the difference between engine revolution NE and turbine revolution NT is small and the synchronizing revolution is in the vicinity of the idle revolution such that it is difficult to determine whether turbine revolution NT synchronizes with the synchronizing revolution by development of gear shifting or just temporarily in synchronism, the determination time is set longer to suppress erroneous determination.

It would be understood that the embodiments of the present invention disclosed herein are by way of example only, and is not to be taken by way of limitation in all aspects. The scope of the present invention is defined, not by the description set forth above, but by the appended claims, and all changes that fall within limits and bounds of the claims, or equivalent thereof are intended to be embraced by the claims.

The invention claimed is:

1. A gear shifting completion determination device for an automatic transmission applied to an automatic transmission coupled to a motive power source via a fluid coupling, and determining whether an upshift in an accelerator off mode is completed or not, said gear shifting completion determination device comprising:
an output shaft revolution detection unit detecting an output shaft revolution of said motive power source,
an input shaft revolution detection unit detecting an input shaft revolution of said automatic transmission,
a calculation unit calculating a synchronizing revolution that is a probable value of the input shaft revolution of said automatic transmission after gear shifting,
a determination unit determining that gear shifting has been completed when a state of said detected input shaft revolution of said automatic transmission synchronizing with said calculated synchronizing revolution continues for at least a determination time, and
a setting unit setting said determination time based on said detected input shaft revolution of said automatic transmission and said output shaft revolution of said motive power source,
wherein said setting unit sets said determination time shorter when a difference between the input shaft revolution of said automatic transmission and the output shaft revolution of said motive power source is large as compared to a state in which said difference is small.

2. The gear shifting completion determination device for an automatic transmission according to claim 1, wherein said setting unit sets said determination time to a first time when a difference between the output shaft revolution of said motive power source and the input shaft revolution of said automatic transmission is at least a predetermined value, and sets said determination time to a second time that is shorter than said first time when said difference is smaller than said predetermined value.

* * * * *